(12) United States Patent
Hamada (10) Patent No.: US 8,910,008 B2
(45) Date of Patent: Dec. 9, 2014

(54) TRANSMITTING/RECEIVING SYSTEM, METHOD, AND COMPUTER READABLE MEDIUM

(75) Inventor: Tsutomu Hamada, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 143 days.

(21) Appl. No.: 13/591,880

(22) Filed: Aug. 22, 2012

(65) Prior Publication Data

US 2013/0179746 A1 Jul. 11, 2013

(30) Foreign Application Priority Data

Jan. 6, 2012 (JP) ................................. 2012-001221

(51) Int. Cl.
| | | |
|---|---|---|
| H04L 1/18 | (2006.01) | |
| G08C 25/02 | (2006.01) | |
| H04L 1/00 | (2006.01) | |
| H04L 12/703 | (2013.01) | |
| H04L 1/16 | (2006.01) | |
| H04L 25/49 | (2006.01) | |

(52) U.S. Cl.
CPC .............. *H04L 1/0061* (2013.01); *H04L 45/28* (2013.01); *H04L 1/1671* (2013.01); *H04L 25/4908* (2013.01)
USPC ........................................... 714/748; 714/751

(58) Field of Classification Search
CPC ....... G06F 13/426; G06F 9/541; G06F 9/545; H04L 12/43; H04L 45/28; H04L 12/4625; H04L 1/1854; G06K 7/0008; H04W 52/0216; H04W 52/0229; H04W 52/0235; H04W 88/06
USPC .................. 714/748–751, 776, 746
See application file for complete search history.

(56) References Cited

U.S. PATENT DOCUMENTS

| 7,076,716 B1 * | 7/2006 | Hauck et al. ................... 714/748 |
| 2005/0071733 A1 * | 3/2005 | Fukae et al. ................... 714/776 |
| 2010/0188972 A1 * | 7/2010 | Knapp ........................... 370/226 |

FOREIGN PATENT DOCUMENTS

| JP | 59-10056 A | 1/1984 |
| JP | 60-154746 A | 8/1985 |

OTHER PUBLICATIONS

"PCI-SIG Board of Directors Approve PCI Express™ Specifications for High-Performance Serial I/O", PCI Express, (http://www.pcisig.com/news_room/news/press_releases_archive/2002_07_23/2002_07_23.pdf, Jul. 23, 2002, 3 pages.

* cited by examiner

*Primary Examiner* — Guy Lamarre
(74) *Attorney, Agent, or Firm* — Sughrue Mion, PLLC (57) ABSTRACT

A transmitting/receiving system includes a first transmitting/receiving apparatus which includes a first transmitting unit and a first receiving unit, and a second transmitting/receiving apparatus which includes a second receiving unit, a detector, a second generator, and a second transmitting unit. The first transmitting unit transmits data with an error detecting code after a bit-number conversion. The first receiving unit receives a response to the data after a bit-number inverse conversion. The second receiving unit subjects the data to a bit-number inverse conversion. The detector detects an error from the error detecting code. The second generator generates a positive or negative acknowledgement depending on the error detection and uses a code which enables distinguishing between positive and negative acknowledgements when a 1-bit error occurs during transportation. The second transmitting unit transmits the acknowledgement after a bit-number conversion to the first transmitting/receiving apparatus.

6 Claims, 11 Drawing Sheets

| | 1 bit | 2 bit | 3 bit | 4 bit | 5 bit | 6 bit | 7 bit | 8 bit | 9 bit | 10 bit |
|---|---|---|---|---|---|---|---|---|---|---|
| D00.0 | D00.2 | D00.6 | NIT | NIT | NIT | NIT | NIT | NIT | NIT | NIT |
| D01.0 | D01.2 | D01.6 | NIT | NIT | NIT | NIT | NIT | NIT | NIT | NIT |
| D02.0 | D02.2 | D02.6 | NIT | NIT | NIT | NIT | NIT | NIT | NIT | NIT |
| D03.0 | D03.5 | D03.1 | NIT | NIT | NIT | NIT | NIT | NIT | NIT | NIT |
| D04.0 | D04.2 | D04.6 | NIT | NIT | NIT | NIT | NIT | NIT | NIT | NIT |
| D05.0 | D05.5 | D05.1 | NIT | NIT | NIT | NIT | NIT | NIT | NIT | NIT |
| D06.0 | D06.5 | D06.1 | NIT | NIT | NIT | NIT | NIT | NIT | NIT | NIT |
| D07.0 | D07.5 | D07.1 | NIT | NIT | NIT | NIT | NIT | NIT | NIT | NIT |
| D08.0 | D08.2 | D08.6 | NIT | NIT | NIT | NIT | NIT | NIT | NIT | NIT |
| D09.0 | D09.5 | D09.1 | NIT | NIT | NIT | NIT | NIT | NIT | NIT | NIT |
| D10.0 | D10.5 | D10.1 | NIT | NIT | NIT | NIT | NIT | NIT | NIT | NIT |
| D11.0 | D11.5 | D11.1 | NIT | NIT | NIT | NIT | NIT | NIT | NIT | NIT |
| D12.0 | D12.5 | D12.1 | NIT | NIT | NIT | NIT | NIT | NIT | NIT | NIT |
| D13.0 | D13.5 | D13.1 | NIT | NIT | NIT | NIT | NIT | NIT | NIT | NIT |
| D14.0 | D14.5 | D14.1 | NIT | NIT | NIT | NIT | NIT | NIT | NIT | NIT |
| D15.0 | D15.2 | D15.6 | NIT | NIT | NIT | NIT | NIT | NIT | NIT | NIT |
| D16.0 | D16.2 | D16.6 | NIT | NIT | NIT | NIT | NIT | NIT | NIT | NIT |
| D17.0 | D17.5 | D17.1 | NIT | NIT | NIT | NIT | NIT | NIT | NIT | NIT |
| D18.0 | D18.5 | D18.1 | NIT | NIT | NIT | NIT | NIT | NIT | NIT | NIT |
| D19.0 | D19.5 | D19.1 | NIT | NIT | NIT | NIT | NIT | NIT | NIT | NIT |
| D20.0 | D20.5 | D20.1 | NIT | NIT | NIT | NIT | NIT | NIT | NIT | NIT |
| D21.0 | D21.5 | D21.1 | NIT | NIT | NIT | NIT | NIT | NIT | NIT | NIT |
| D22.0 | D22.5 | D22.1 | NIT | NIT | NIT | NIT | NIT | NIT | NIT | NIT |
| D23.0 | D23.2 | D23.6 | NIT | NIT | NIT | NIT | NIT | NIT | NIT | NIT |
| D24.0 | D24.2 | D24.6 | NIT | NIT | NIT | NIT | NIT | NIT | NIT | NIT |
| D25.0 | D25.5 | D25.1 | NIT | NIT | NIT | NIT | NIT | NIT | NIT | NIT |
| D26.0 | D26.5 | D26.1 | NIT | NIT | NIT | NIT | NIT | NIT | NIT | NIT |
| D27.0 | D27.2 | D27.6 | NIT | NIT | NIT | NIT | NIT | NIT | NIT | NIT |
| D28.0 | D28.5 | D28.1 | NIT | NIT | NIT | NIT | NIT | NIT | NIT | NIT |
| D29.0 | D29.2 | D29.6 | NIT | NIT | NIT | NIT | NIT | NIT | NIT | NIT |
| D30.0 | D30.2 | D30.6 | NIT | NIT | NIT | NIT | NIT | NIT | NIT | NIT |
| D31.0 | D31.2 | D31.6 | NIT | NIT | NIT | NIT | NIT | NIT | NIT | NIT |

FIG. 2B

|  | 1 bit | 2 bit | 3 bit | 4 bit | 5 bit | 6 bit | 7 bit | 8 bit | 9 bit | 10 bit |
|---|---|---|---|---|---|---|---|---|---|---|
| D00.1 | NIT | NIT | NIT | D00.7 | D25.1 | D09.1 | D17.1 | NIT | NIT | NIT |
| D01.1 | NIT | NIT | NIT | D01.7 | D14.1 | NIT | D06.1 | D10.1 | D12.1 | NIT |
| D02.1 | NIT | NIT | NIT | D02.7 | D13.1 | NIT | D05.1 | D09.1 | NIT | D12.1 |
| D03.1 | NIT | D03.0 | D03.4 | NIT | NIT | D24.1 | D04.1 | D08.1 | NIT | NIT |
| D04.1 | NIT | NIT | NIT | D04.7 | D11.1 | NIT | D03.1 | NIT | D09.1 | D10.1 |
| D05.1 | NIT | D05.0 | D05.4 | NIT | NIT | D31.1 | D02.1 | NIT | D08.1 | NIT |
| D06.1 | NIT | D06.0 | D06.4 | NIT | NIT | D16.1 | D01.1 | NIT | NIT | D08.1 |
| D07.1 | NIT | D07.0 | D07.4 | NIT | D08.1 | D23.1 | NIT | NIT | NIT | NIT |
| D08.1 | NIT | NIT | NIT | D08.7 | D07.1 | NIT | NIT | D03.1 | D05.1 | D06.1 |
| D09.1 | NIT | D09.0 | D09.4 | NIT | NIT | D00.1 | NIT | D02.1 | D04.1 | NIT |
| D10.1 | NIT | D10.0 | D10.4 | NIT | NIT | D15.1 | NIT | D01.1 | NIT | D04.1 |
| D11.1 | NIT | D11.0 | D11.4 | NIT | D04.1 | D27.1 | NIT | NIT | NIT | NIT |
| D12.1 | NIT | D12.0 | D12.4 | NIT | NIT | K28.1 | NIT | NIT | D01.1 | D02.1 |
| D13.1 | NIT | D13.0 | D13.4 | NIT | D02.1 | D29.1 | NIT | NIT | NIT | NIT |
| D14.1 | NIT | D14.0 | D14.4 | NIT | D01.1 | D30.1 | NIT | NIT | NIT | NIT |
| D15.1 | NIT | NIT | NIT | D15.7 | D26.1 | D10.1 | D18.1 | NIT | NIT | NIT |
| D16.1 | NIT | NIT | NIT | D16.7 | D22.1 | D06.1 | NIT | D18.1 | D20.1 | NIT |
| D17.1 | NIT | D17.0 | D17.4 | NIT | NIT | NIT | D00.1 | D31.1 | D24.1 | NIT |
| D18.1 | NIT | D18.0 | D18.4 | NIT | NIT | NIT | D15.1 | D16.1 | NIT | D24.1 |
| D19.1 | NIT | D19.0 | D19.4 | NIT | D24.1 | NIT | D27.1 | D23.1 | NIT | NIT |
| D20.1 | NIT | D20.0 | D20.4 | NIT | NIT | NIT | K28.1 | NIT | D16.1 | D31.1 |
| D21.1 | NIT | D21.0 | D21.4 | NIT | D31.1 | NIT | D29.1 | NIT | D23.1 | NIT |
| D22.1 | NIT | D22.0 | D22.4 | NIT | D16.1 | NIT | D30.1 | NIT | NIT | D23.1 |
| D23.1 | K23.7 | NIT | NIT | D23.7 | NIT | D07.1 | NIT | D19.1 | D21.1 | D22.1 |
| D24.1 | NIT | NIT | NIT | D24.7 | D19.1 | D03.1 | NIT | NIT | D17.1 | D18.1 |
| D25.1 | NIT | D25.0 | D25.4 | NIT | D00.1 | NIT | NIT | D29.1 | D27.1 | NIT |
| D26.1 | NIT | D26.0 | D26.4 | NIT | D15.1 | NIT | D30.1 | NIT | NIT | D27.1 |
| D27.1 | K27.7 | NIT | NIT | D27.7 | NIT | D11.1 | D19.1 | NIT | D25.1 | D26.1 |
| D28.1 | NIT | D28.0 | D28.4 | NIT | K28.1 | NIT | NIT | NIT | D30.1 | D29.1 |
| D29.1 | K29.7 | NIT | NIT | D29.7 | NIT | D13.1 | D21.1 | D25.1 | NIT | D28.1 |
| D30.1 | K30.7 | NIT | NIT | D30.7 | NIT | D14.1 | D22.1 | D26.1 | D28.1 | NIT |
| D31.1 | NIT | NIT | NIT | D31.7 | D21.1 | D05.1 | NIT | D17.1 | NIT | D20.1 |

FIG. 2C

|        | 1 bit | 2 bit | 3 bit | 4 bit | 5 bit | 6 bit | 7 bit | 8 bit | 9 bit | 10 bit |
|--------|-------|-------|-------|-------|-------|-------|-------|-------|-------|--------|
| D00.2  | D00.0 | NIT   | D00.7 | NIT   | D25.2 | D09.2 | D17.2 | NIT   | NIT   | NIT    |
| D01.2  | D01.0 | NIT   | D01.7 | NIT   | D14.2 | NIT   | D06.2 | D10.2 | D12.2 | NIT    |
| D02.2  | D02.0 | NIT   | D02.7 | NIT   | D13.2 | NIT   | D05.2 | D09.2 | NIT   | D12.2  |
| D03.2  | NIT   | NIT   | NIT   | D03.4 | NIT   | D24.2 | D04.2 | D08.2 | NIT   | NIT    |
| D04.2  | D04.0 | NIT   | D04.7 | NIT   | D11.2 | NIT   | D03.2 | NIT   | D09.2 | D10.2  |
| D05.2  | NIT   | NIT   | NIT   | D05.4 | NIT   | D31.2 | D02.2 | NIT   | D08.2 | NIT    |
| D06.2  | NIT   | NIT   | NIT   | D06.4 | NIT   | D16.2 | D01.2 | NIT   | NIT   | D08.2  |
| D07.2  | NIT   | NIT   | NIT   | D07.4 | D08.2 | D23.2 | NIT   | NIT   | NIT   | NIT    |
| D08.2  | D08.0 | NIT   | D08.7 | NIT   | D07.2 | NIT   | NIT   | D03.2 | D05.2 | D06.2  |
| D09.2  | NIT   | NIT   | NIT   | D09.4 | NIT   | D00.2 | NIT   | D02.2 | D04.2 | NIT    |
| D10.2  | NIT   | NIT   | NIT   | D10.4 | NIT   | D15.2 | NIT   | D01.2 | NIT   | D04.2  |
| D11.2  | NIT   | NIT   | NIT   | D11.4 | D04.2 | D27.2 | NIT   | NIT   | NIT   | NIT    |
| D12.2  | NIT   | NIT   | NIT   | D12.4 | NIT   | K28.2 | NIT   | NIT   | D01.2 | D02.2  |
| D13.2  | NIT   | NIT   | NIT   | D13.4 | D02.2 | D29.2 | NIT   | NIT   | NIT   | NIT    |
| D14.2  | NIT   | NIT   | NIT   | D14.4 | D01.2 | D30.2 | NIT   | NIT   | NIT   | NIT    |
| D15.2  | D15.0 | NIT   | D15.7 | NIT   | D26.2 | D10.2 | D18.2 | NIT   | NIT   | NIT    |
| D16.2  | D16.0 | NIT   | D16.7 | NIT   | D22.2 | D06.2 | NIT   | D18.2 | D20.2 | NIT    |
| D17.2  | NIT   | D17.7 | NIT   | D17.4 | NIT   | NIT   | D00.2 | D31.2 | D24.2 | NIT    |
| D18.2  | NIT   | D18.7 | NIT   | D18.4 | NIT   | NIT   | D15.2 | D16.2 | NIT   | D24.2  |
| D19.2  | NIT   | NIT   | NIT   | D19.4 | D24.2 | NIT   | D27.2 | D23.2 | NIT   | NIT    |
| D20.2  | NIT   | D20.7 | NIT   | D20.4 | NIT   | NIT   | K28.2 | NIT   | D16.2 | D31.2  |
| D21.2  | NIT   | NIT   | NIT   | D21.4 | D31.2 | NIT   | D29.2 | NIT   | D23.2 | NIT    |
| D22.2  | NIT   | NIT   | NIT   | D22.4 | D16.2 | NIT   | D30.2 | NIT   | NIT   | D23.2  |
| D23.2  | D23.0 | NIT   | D23.7 | NIT   | NIT   | D07.2 | NIT   | D19.2 | D21.2 | D22.2  |
| D24.2  | D24.0 | NIT   | D24.7 | NIT   | D19.2 | D03.2 | NIT   | NIT   | D17.2 | D18.2  |
| D25.2  | NIT   | NIT   | NIT   | D25.4 | D00.2 | NIT   | NIT   | D29.2 | D27.2 | NIT    |
| D26.2  | NIT   | NIT   | NIT   | D26.4 | D15.2 | NIT   | NIT   | D30.2 | NIT   | D27.2  |
| D27.2  | D27.0 | NIT   | D27.7 | NIT   | NIT   | D11.2 | D19.2 | NIT   | D25.2 | D26.2  |
| D28.2  | NIT   | NIT   | NIT   | D28.4 | K28.2 | NIT   | NIT   | NIT   | D30.2 | D29.2  |
| D29.2  | D29.0 | NIT   | D29.7 | NIT   | NIT   | D13.2 | D21.2 | D25.2 | NIT   | D28.2  |
| D30.2  | D30.0 | NIT   | D30.7 | NIT   | NIT   | D14.2 | D22.2 | D26.2 | D28.2 | NIT    |
| D31.2  | D31.0 | NIT   | D31.7 | NIT   | D21.2 | D05.2 | NIT   | D17.2 | NIT   | D20.2  |

FIG. 2D

| | 1 bit | 2 bit | 3 bit | 4 bit | 5 bit | 6 bit | 7 bit | 8 bit | 9 bit | 10 bit |
|---|---|---|---|---|---|---|---|---|---|---|
| D00.3 | D00.4 | D00.7 | NIT | NIT | NIT | NIT | NIT | NIT | NIT | NIT |
| D01.3 | D01.4 | D01.7 | NIT | NIT | NIT | NIT | NIT | NIT | NIT | NIT |
| D02.3 | D02.4 | D02.7 | NIT | NIT | NIT | NIT | NIT | NIT | NIT | NIT |
| D03.3 | D03.4 | D03.7 | NIT | NIT | NIT | NIT | NIT | NIT | NIT | NIT |
| D04.3 | D04.4 | D04.7 | NIT | NIT | NIT | NIT | NIT | NIT | NIT | NIT |
| D05.3 | D05.4 | D05.7 | NIT | NIT | NIT | NIT | NIT | NIT | NIT | NIT |
| D06.3 | D06.4 | D06.7 | NIT | NIT | NIT | NIT | NIT | NIT | NIT | NIT |
| D07.3 | D07.4 | D07.7 | NIT | NIT | NIT | NIT | NIT | NIT | NIT | NIT |
| D08.3 | D08.4 | D08.7 | NIT | NIT | NIT | NIT | NIT | NIT | NIT | NIT |
| D09.3 | D09.4 | D09.7 | NIT | NIT | NIT | NIT | NIT | NIT | NIT | NIT |
| D10.3 | D10.4 | D10.7 | NIT | NIT | NIT | NIT | NIT | NIT | NIT | NIT |
| D11.3 | D11.4 | D11.7 | NIT | NIT | NIT | NIT | NIT | NIT | NIT | NIT |
| D12.3 | D12.4 | D12.7 | NIT | NIT | NIT | NIT | NIT | NIT | NIT | NIT |
| D13.3 | D13.4 | D13.7 | NIT | NIT | NIT | NIT | NIT | NIT | NIT | NIT |
| D14.3 | D14.4 | D14.7 | NIT | NIT | NIT | NIT | NIT | NIT | NIT | NIT |
| D15.3 | D15.4 | D15.7 | NIT | NIT | NIT | NIT | NIT | NIT | NIT | NIT |
| D16.3 | D16.4 | D16.7 | NIT | NIT | NIT | NIT | NIT | NIT | NIT | NIT |
| D17.3 | D17.4 | NIT | NIT | NIT | NIT | NIT | NIT | NIT | NIT | NIT |
| D18.3 | D18.4 | NIT | NIT | NIT | NIT | NIT | NIT | NIT | NIT | NIT |
| D19.3 | D19.4 | D19.7 | NIT | NIT | NIT | NIT | NIT | NIT | NIT | NIT |
| D20.3 | D20.4 | NIT | NIT | NIT | NIT | NIT | NIT | NIT | NIT | NIT |
| D21.3 | D21.4 | D21.7 | NIT | NIT | NIT | NIT | NIT | NIT | NIT | NIT |
| D22.3 | D22.4 | D22.7 | NIT | NIT | NIT | NIT | NIT | NIT | NIT | NIT |
| D23.3 | D23.4 | D23.7 | NIT | NIT | NIT | NIT | NIT | NIT | NIT | NIT |
| D24.3 | D24.4 | D24.7 | NIT | NIT | NIT | NIT | NIT | NIT | NIT | NIT |
| D25.3 | D25.4 | D25.7 | NIT | NIT | NIT | NIT | NIT | NIT | NIT | NIT |
| D26.3 | D26.4 | D26.7 | NIT | NIT | NIT | NIT | NIT | NIT | NIT | NIT |
| D27.3 | D27.4 | D27.7 | NIT | NIT | NIT | NIT | NIT | NIT | NIT | NIT |
| D28.3 | D28.4 | D28.7 | NIT | NIT | NIT | NIT | NIT | NIT | NIT | NIT |
| D29.3 | D29.4 | D29.7 | NIT | NIT | NIT | NIT | NIT | NIT | NIT | NIT |
| D30.3 | D30.4 | D30.7 | NIT | NIT | NIT | NIT | NIT | NIT | NIT | NIT |
| D31.3 | D31.4 | D31.7 | NIT | NIT | NIT | NIT | NIT | NIT | NIT | NIT |

FIG. 2E

|  | 1 bit | 2 bit | 3 bit | 4 bit | 5 bit | 6 bit | 7 bit | 8 bit | 9 bit | 10 bit |
|---|---|---|---|---|---|---|---|---|---|---|
| D00.4 | D00.3 | NIT | D00.6 | D00.5 | NIT | NIT | NIT | NIT | NIT | NIT |
| D01.4 | D01.3 | NIT | D01.6 | D01.5 | NIT | NIT | NIT | NIT | NIT | NIT |
| D02.4 | D02.3 | NIT | D02.6 | D02.5 | NIT | NIT | NIT | NIT | NIT | NIT |
| D03.4 | D03.3 | NIT | D03.1 | D03.2 | NIT | NIT | NIT | NIT | NIT | NIT |
| D04.4 | D04.3 | NIT | D04.6 | D04.5 | NIT | NIT | NIT | NIT | NIT | NIT |
| D05.4 | D05.3 | NIT | D05.1 | D05.2 | NIT | NIT | NIT | NIT | NIT | NIT |
| D06.4 | D06.3 | NIT | D06.1 | D06.2 | NIT | NIT | NIT | NIT | NIT | NIT |
| D07.4 | D07.3 | NIT | D07.1 | D07.2 | NIT | NIT | NIT | NIT | NIT | NIT |
| D08.4 | D08.3 | NIT | D08.6 | D08.5 | NIT | NIT | NIT | NIT | NIT | NIT |
| D09.4 | D09.3 | NIT | D09.1 | D09.2 | NIT | NIT | NIT | NIT | NIT | NIT |
| D10.4 | D10.3 | NIT | D10.1 | D10.2 | NIT | NIT | NIT | NIT | NIT | NIT |
| D11.4 | D11.3 | NIT | D11.1 | D11.2 | NIT | NIT | NIT | NIT | NIT | NIT |
| D12.4 | D12.3 | NIT | D12.1 | D12.2 | NIT | NIT | NIT | NIT | NIT | NIT |
| D13.4 | D13.3 | NIT | D13.1 | D13.2 | NIT | NIT | NIT | NIT | NIT | NIT |
| D14.4 | D14.3 | NIT | D14.1 | D14.2 | NIT | NIT | NIT | NIT | NIT | NIT |
| D15.4 | D15.3 | NIT | D15.6 | D15.5 | NIT | NIT | NIT | NIT | NIT | NIT |
| D16.4 | D16.3 | NIT | D16.6 | D16.5 | NIT | NIT | NIT | NIT | NIT | NIT |
| D17.4 | D17.3 | NIT | D17.1 | D17.2 | NIT | NIT | NIT | NIT | NIT | NIT |
| D18.4 | D18.3 | NIT | D18.1 | D18.2 | NIT | NIT | NIT | NIT | NIT | NIT |
| D19.4 | D19.3 | NIT | D19.1 | D19.2 | NIT | NIT | NIT | NIT | NIT | NIT |
| D20.4 | D20.3 | NIT | D20.1 | D20.2 | NIT | NIT | NIT | NIT | NIT | NIT |
| D21.4 | D21.3 | NIT | D21.1 | D21.2 | NIT | NIT | NIT | NIT | NIT | NIT |
| D22.4 | D22.3 | NIT | D22.1 | D22.2 | NIT | NIT | NIT | NIT | NIT | NIT |
| D23.4 | D23.3 | NIT | D23.6 | D23.5 | NIT | NIT | NIT | NIT | NIT | NIT |
| D24.4 | D24.3 | NIT | D24.6 | D24.5 | NIT | NIT | NIT | NIT | NIT | NIT |
| D25.4 | D25.3 | NIT | D25.1 | D25.2 | NIT | NIT | NIT | NIT | NIT | NIT |
| D26.4 | D26.3 | NIT | D26.1 | D26.2 | NIT | NIT | NIT | NIT | NIT | NIT |
| D27.4 | D27.3 | NIT | D27.6 | D27.5 | NIT | NIT | NIT | NIT | NIT | NIT |
| D28.4 | D28.3 | NIT | D28.1 | D28.2 | NIT | NIT | NIT | NIT | NIT | NIT |
| D29.4 | D29.3 | NIT | D29.6 | D29.5 | NIT | NIT | NIT | NIT | NIT | NIT |
| D30.4 | D30.3 | NIT | D30.6 | D30.5 | NIT | NIT | NIT | NIT | NIT | NIT |
| D31.4 | D31.3 | NIT | D31.6 | D31.5 | NIT | NIT | NIT | NIT | NIT | NIT |

FIG. 2F

|       | 1 bit  | 2 bit  | 3 bit  | 4 bit  | 5 bit  | 6 bit  | 7 bit  | 8 bit  | 9 bit  | 10 bit |
|-------|--------|--------|--------|--------|--------|--------|--------|--------|--------|--------|
| D00.5 | NIT    | NIT    | NIT    | D00.4  | D25.5  | D09.5  | D17.5  | NIT    | NIT    | NIT    |
| D01.5 | NIT    | NIT    | NIT    | D01.4  | D14.5  | NIT    | D06.5  | D10.5  | D12.5  | NIT    |
| D02.5 | NIT    | NIT    | NIT    | D02.4  | D13.5  | NIT    | D05.5  | D09.5  | NIT    | D12.5  |
| D03.5 | D03.0  | NIT    | D03.7  | NIT    | NIT    | D24.5  | D04.5  | D08.5  | NIT    | NIT    |
| D04.5 | NIT    | NIT    | NIT    | D04.4  | D11.5  | NIT    | D03.5  | NIT    | D09.5  | D10.5  |
| D05.5 | D05.0  | NIT    | D05.7  | NIT    | NIT    | D31.5  | D02.5  | NIT    | D08.5  | NIT    |
| D06.5 | D06.0  | NIT    | D06.7  | NIT    | NIT    | D16.5  | D01.5  | NIT    | NIT    | D08.5  |
| D07.5 | D07.0  | NIT    | D07.7  | NIT    | D08.5  | D23.5  | NIT    | NIT    | NIT    | NIT    |
| D08.5 | NIT    | NIT    | NIT    | D08.4  | D07.5  | NIT    | NIT    | D03.5  | D05.5  | D06.5  |
| D09.5 | D09.0  | NIT    | D09.7  | NIT    | NIT    | D00.5  | NIT    | D02.5  | D04.5  | NIT    |
| D10.5 | D10.0  | NIT    | D10.7  | NIT    | NIT    | D15.5  | NIT    | D01.5  | NIT    | D04.5  |
| D11.5 | D11.0  | NIT    | D11.7  | NIT    | D04.5  | D27.5  | NIT    | NIT    | NIT    | NIT    |
| D12.5 | D12.0  | NIT    | D12.7  | NIT    | NIT    | K28.5  | NIT    | NIT    | D01.5  | D02.5  |
| D13.5 | D13.0  | NIT    | D13.7  | NIT    | D02.5  | D29.5  | NIT    | NIT    | NIT    | NIT    |
| D14.5 | D14.0  | NIT    | D14.7  | NIT    | D01.5  | D30.5  | NIT    | NIT    | NIT    | NIT    |
| D15.5 | NIT    | NIT    | NIT    | D15.4  | D26.5  | D10.5  | D18.5  | NIT    | NIT    | NIT    |
| D16.5 | NIT    | NIT    | NIT    | D16.4  | D22.5  | D06.5  | NIT    | D18.5  | D20.5  | NIT    |
| D17.5 | D17.0  | NIT    | NIT    | NIT    | NIT    | NIT    | D00.5  | D31.5  | D24.5  | NIT    |
| D18.5 | D18.0  | NIT    | NIT    | NIT    | NIT    | NIT    | D15.5  | D16.5  | NIT    | D24.5  |
| D19.5 | D19.0  | NIT    | D19.7  | NIT    | D24.5  | NIT    | D27.5  | D23.5  | NIT    | NIT    |
| D20.5 | D20.0  | NIT    | NIT    | NIT    | NIT    | NIT    | K28.5  | NIT    | D16.5  | D31.5  |
| D21.5 | D21.0  | NIT    | D21.7  | NIT    | D31.5  | NIT    | D29.5  | NIT    | D23.5  | NIT    |
| D22.5 | D22.0  | NIT    | D22.7  | NIT    | D16.5  | NIT    | D30.5  | NIT    | NIT    | D23.5  |
| D23.5 | NIT    | K23.7  | NIT    | D23.4  | NIT    | D07.5  | NIT    | D19.5  | D21.5  | D22.5  |
| D24.5 | NIT    | NIT    | NIT    | D24.4  | D19.5  | D03.5  | NIT    | NIT    | D17.5  | D18.5  |
| D25.5 | D25.0  | NIT    | D25.7  | NIT    | D00.5  | NIT    | NIT    | D29.5  | D27.5  | NIT    |
| D26.5 | D26.0  | NIT    | D26.7  | NIT    | D15.5  | NIT    | NIT    | D30.5  | NIT    | D27.5  |
| D27.5 | NIT    | K27.7  | NIT    | D27.4  | NIT    | D11.5  | D19.5  | NIT    | D25.5  | D26.5  |
| D28.5 | D28.0  | NIT    | D28.7  | NIT    | K28.5  | NIT    | NIT    | NIT    | D30.5  | D29.5  |
| D29.5 | NIT    | K29.7  | NIT    | D29.4  | NIT    | D13.5  | D21.5  | D25.5  | NIT    | D28.5  |
| D30.5 | NIT    | K30.7  | NIT    | D30.4  | NIT    | D14.5  | D22.5  | D26.5  | D28.5  | NIT    |
| D31.5 | NIT    | NIT    | NIT    | D31.4  | D21.5  | D05.5  | NIT    | D17.5  | NIT    | D20.5  |

FIG. 2G

|  | 1 bit | 2 bit | 3 bit | 4 bit | 5 bit | 6 bit | 7 bit | 8 bit | 9 bit | 10 bit |
|---|---|---|---|---|---|---|---|---|---|---|
| D00.6 | NIT | D00.0 | D00.4 | NIT | D25.6 | D09.6 | D17.6 | NIT | NIT | NIT |
| D01.6 | NIT | D01.0 | D01.4 | NIT | D14.6 | NIT | D06.6 | D10.6 | D12.6 | NIT |
| D02.6 | NIT | D02.0 | D02.4 | NIT | D13.6 | NIT | D05.6 | D09.6 | NIT | D12.6 |
| D03.6 | NIT | NIT | NIT | D03.7 | NIT | D24.6 | D04.6 | D08.6 | NIT | NIT |
| D04.6 | NIT | D04.0 | D04.4 | NIT | D11.6 | NIT | D03.6 | NIT | D09.6 | D10.6 |
| D05.6 | NIT | NIT | NIT | D05.7 | NIT | D31.6 | D02.6 | NIT | D08.6 | NIT |
| D06.6 | NIT | NIT | NIT | D06.7 | NIT | D16.6 | D01.6 | NIT | NIT | D08.6 |
| D07.6 | NIT | NIT | NIT | D07.7 | D08.6 | D23.6 | NIT | NIT | NIT | NIT |
| D08.6 | NIT | D08.0 | D08.4 | NIT | D07.6 | NIT | NIT | D03.6 | D05.6 | D06.6 |
| D09.6 | NIT | NIT | NIT | D09.7 | NIT | D00.6 | NIT | D02.6 | D04.6 | NIT |
| D10.6 | NIT | NIT | NIT | D10.7 | NIT | D15.6 | NIT | D01.6 | NIT | D04.6 |
| D11.6 | NIT | NIT | NIT | D11.7 | D04.6 | D27.6 | NIT | NIT | NIT | NIT |
| D12.6 | NIT | NIT | NIT | D12.7 | NIT | K28.6 | NIT | NIT | D01.6 | D02.6 |
| D13.6 | NIT | NIT | NIT | D13.7 | D02.6 | D29.6 | NIT | NIT | NIT | NIT |
| D14.6 | NIT | NIT | NIT | D14.7 | D01.6 | D30.6 | NIT | NIT | NIT | NIT |
| D15.6 | NIT | D15.0 | D15.4 | NIT | D26.6 | D10.6 | D18.6 | NIT | NIT | NIT |
| D16.6 | NIT | D16.0 | D16.4 | NIT | D22.6 | D06.6 | NIT | D18.6 | D20.6 | NIT |
| D17.6 | D17.7 | NIT | NIT | NIT | NIT | NIT | D00.6 | D31.6 | D24.6 | NIT |
| D18.6 | D18.7 | NIT | NIT | NIT | NIT | NIT | D15.6 | D16.6 | NIT | D24.6 |
| D19.6 | NIT | NIT | NIT | D19.7 | D24.6 | NIT | D27.6 | D23.6 | NIT | NIT |
| D20.6 | D20.7 | NIT | NIT | NIT | NIT | NIT | K28.6 | NIT | D16.6 | D31.6 |
| D21.6 | NIT | NIT | NIT | D21.7 | D31.6 | NIT | D29.6 | NIT | D23.6 | NIT |
| D22.6 | NIT | NIT | NIT | D22.7 | D16.6 | NIT | D30.6 | NIT | NIT | D23.6 |
| D23.6 | NIT | D23.0 | D23.4 | NIT | NIT | D07.6 | NIT | D19.6 | D21.6 | D22.6 |
| D24.6 | NIT | D24.0 | D24.4 | NIT | D19.6 | D03.6 | NIT | NIT | D17.6 | D18.6 |
| D25.6 | NIT | NIT | NIT | D25.7 | D00.6 | NIT | NIT | D29.6 | D27.6 | NIT |
| D26.6 | NIT | NIT | NIT | D26.7 | D15.6 | NIT | NIT | D30.6 | NIT | D27.6 |
| D27.6 | NIT | D27.0 | D27.4 | NIT | NIT | D11.6 | D19.6 | NIT | D25.6 | D26.6 |
| D28.6 | NIT | NIT | NIT | D28.7 | K28.6 | NIT | NIT | NIT | D30.6 | D29.6 |
| D29.6 | NIT | D29.0 | D29.4 | NIT | NIT | D13.6 | D21.6 | D25.6 | NIT | D28.6 |
| D30.6 | NIT | D30.0 | D30.4 | NIT | NIT | D14.6 | D22.6 | D26.6 | D28.6 | NIT |
| D31.6 | NIT | D31.0 | D31.4 | NIT | D21.6 | D05.6 | NIT | D17.6 | NIT | D20.6 |

FIG. 2H

|  | 1 bit | 2 bit | 3 bit | 4 bit | 5 bit | 6 bit | 7 bit | 8 bit | 9 bit | 10 bit |
|---|---|---|---|---|---|---|---|---|---|---|
| D00.7 | NIT | D00.3 | D00.2 | D00.1 | NIT | NIT | NIT | NIT | NIT | NIT |
| D01.7 | NIT | D01.3 | D01.2 | D01.1 | NIT | NIT | NIT | NIT | NIT | NIT |
| D02.7 | NIT | D02.3 | D02.2 | D02.1 | NIT | NIT | NIT | NIT | NIT | NIT |
| D03.7 | NIT | D03.3 | D03.5 | D03.6 | NIT | NIT | NIT | NIT | NIT | NIT |
| D04.7 | NIT | D04.3 | D04.2 | D04.1 | NIT | NIT | NIT | NIT | NIT | NIT |
| D05.7 | NIT | D05.3 | D05.5 | D05.6 | NIT | NIT | NIT | NIT | NIT | NIT |
| D06.7 | NIT | D06.3 | D06.5 | D06.6 | NIT | NIT | NIT | NIT | NIT | NIT |
| D07.7 | NIT | D07.3 | D07.5 | D07.6 | NIT | NIT | NIT | NIT | NIT | NIT |
| D08.7 | NIT | D08.3 | D08.2 | D08.1 | NIT | NIT | NIT | NIT | NIT | NIT |
| D09.7 | NIT | D09.3 | D09.5 | D09.6 | NIT | NIT | NIT | NIT | NIT | NIT |
| D10.7 | NIT | D10.3 | D10.5 | D10.6 | NIT | NIT | NIT | NIT | NIT | NIT |
| D11.7 | NIT | D11.3 | D11.5 | D11.6 | NIT | NIT | NIT | NIT | NIT | NIT |
| D12.7 | NIT | D12.3 | D12.5 | D12.6 | NIT | NIT | NIT | NIT | NIT | NIT |
| D13.7 | NIT | D13.3 | D13.5 | D13.6 | NIT | NIT | NIT | NIT | NIT | NIT |
| D14.7 | NIT | D14.3 | D14.5 | D14.6 | NIT | NIT | NIT | NIT | NIT | NIT |
| D15.7 | NIT | D15.3 | D15.2 | D15.1 | NIT | NIT | NIT | NIT | NIT | NIT |
| D16.7 | NIT | D16.3 | D16.2 | D16.1 | NIT | NIT | NIT | NIT | NIT | NIT |
| D17.7 | D17.6 | D17.2 | NIT | NIT | NIT | NIT | NIT | NIT | NIT | NIT |
| D18.7 | D18.6 | D18.2 | NIT | NIT | NIT | NIT | NIT | NIT | NIT | NIT |
| D19.7 | NIT | D19.3 | D19.5 | D19.6 | NIT | NIT | NIT | NIT | NIT | NIT |
| D20.7 | D20.6 | D20.2 | NIT | NIT | NIT | NIT | NIT | NIT | NIT | NIT |
| D21.7 | NIT | D21.3 | D21.5 | D21.6 | NIT | NIT | NIT | NIT | NIT | NIT |
| D22.7 | NIT | D22.3 | D22.5 | D22.6 | NIT | NIT | NIT | NIT | NIT | NIT |
| D23.7 | NIT | D23.3 | D23.2 | D23.1 | NIT | NIT | NIT | NIT | NIT | NIT |
| D24.7 | NIT | D24.3 | D24.2 | D24.1 | NIT | NIT | NIT | NIT | NIT | NIT |
| D25.7 | NIT | D25.3 | D25.5 | D25.6 | NIT | NIT | NIT | NIT | NIT | NIT |
| D26.7 | NIT | D26.3 | D26.5 | D26.6 | NIT | NIT | NIT | NIT | NIT | NIT |
| D27.7 | NIT | D27.3 | D27.2 | D27.1 | NIT | NIT | NIT | NIT | NIT | NIT |
| D28.7 | NIT | D28.3 | D28.5 | D28.6 | NIT | NIT | NIT | NIT | NIT | NIT |
| D29.7 | NIT | D29.3 | D29.2 | D29.1 | NIT | NIT | NIT | NIT | NIT | NIT |
| D30.7 | NIT | D30.3 | D30.2 | D30.1 | NIT | NIT | NIT | NIT | NIT | NIT |
| D31.7 | NIT | D31.3 | D31.2 | D31.1 | NIT | NIT | NIT | NIT | NIT | NIT |

FIG. 3

| TRANSMISSION DATA | RECEPTION DATA | | | | | | | |
|---|---|---|---|---|---|---|---|---|
| | Dxx.0 | Dxx.1 | Dxx.2 | Dxx.3 | Dxx.4 | Dxx.5 | Dxx.6 | Dxx.7 |
| Dxx.0 | C | E | E | | | E | E | |
| Dxx.3 | | | | C | E | | | E |

FIG. 5B

TRANSMITTING/RECEIVING SYSTEM, METHOD, AND COMPUTER READABLE MEDIUM

CROSS-REFERENCE TO RELATED APPLICATIONS

This application is based on and claims priority under 35 USC 119 from Japanese Patent Application No. 2012-001221 filed Jan. 6, 2012.

BACKGROUND (i) Technical Field

The present invention relates to a transmitting/receiving system, a method, and a computer readable medium.

(ii) Related Art

Systems are known in which an error occurring during transportation is detected by using a cyclic redundancy check (CRC) code as an error detecting code, and in which, as a reception response, a positive acknowledgement (ACK) is transmitted when no errors are detected, whereas a negative acknowledgement (NAK) is transmitted when an error is detected.

SUMMARY

According to an aspect of the present invention, a transmitting/receiving system includes first and second transmitting/receiving apparatuses. The first transmitting/receiving apparatus includes a first transmitting unit and a first receiving unit. The first transmitting unit subjects transmission data to which an error detecting code is attached, to a conversion of the number of bits and transmits the converted transmission data. The first receiving unit subjects a response to the transmission of the transmission data to which the error detecting code is attached, to an inverse conversion of the number of bits and receives the converted response. The second transmitting/receiving apparatus includes a second receiving unit, a detector, a second generator, and a second transmitting unit. The second receiving unit subjects the transmission data which has been transmitted by the first transmitting unit of the first transmitting/receiving apparatus, to an inverse conversion of the number of bits. The detector detects an error on the basis of the error detecting code attached to the transmission data that has been subjected to the inverse conversion of the number of bits by the second receiving unit. The second generator generates a positive acknowledgement or a negative acknowledgement in accordance with the presence or absence of the error detection performed by the detector and uses a code with which it is possible to distinguish between the positive acknowledgement and the negative acknowledgement even when a 1-bit error occurs. The 1-bit error is caused by transportation when the positive acknowledgement or the negative acknowledgement is transmitted to the first transmitting/receiving apparatus. The second transmitting unit subjects the positive acknowledgement or the negative acknowledgement generated by the second generator, to a conversion of the number of bits and transmits the converted acknowledgement to the first transmitting/receiving apparatus.

BRIEF DESCRIPTION OF THE DRAWINGS

Exemplary embodiment of the present invention will be described in detail based on the following figures, wherein:

FIG. 2B is a diagram illustrating patterns of the 8B10B inverse conversion which correspond to ten error patterns;

FIG. 2C is a diagram illustrating patterns of the 8B10B inverse conversion which correspond to ten error patterns;

FIG. 2E is a diagram illustrating patterns of the 8B10B inverse conversion which correspond to ten error patterns;

FIG. 2F is a diagram illustrating patterns of the 8B10B inverse conversion which correspond to ten error patterns;

FIG. 2G is a diagram illustrating patterns of the 8B10B inverse conversion which correspond to ten error patterns;

FIG. 2H is a diagram illustrating patterns of the 8B10B inverse conversion which correspond to ten error patterns;

DETAILED DESCRIPTION

Hereinafter, an exemplary embodiment of the present invention will be described with reference to the drawings. In the drawings, the components having substantially the same function are designated with an identical reference character, and the repeated description will be avoided.

Figure 1:
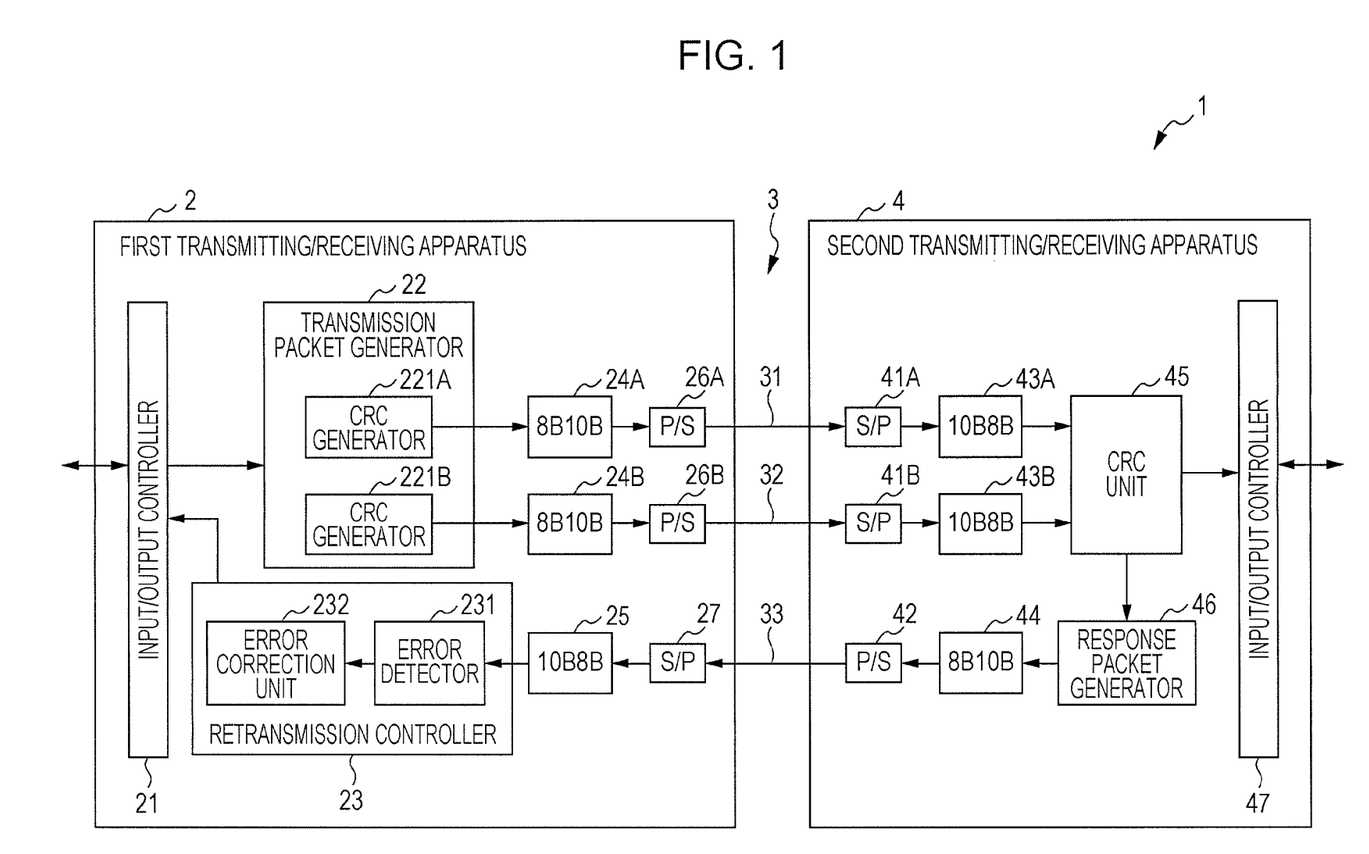
FIG. 1 is a block diagram illustrating an exemplary configuration of a transmitting/receiving system according to an exemplary embodiment of the present invention.

FIG. 1 is a block diagram illustrating an exemplary configuration of a transmitting/receiving system according to an exemplary embodiment of the present invention. A transmitting/receiving system 1 includes a first transmitting/receiving apparatus 2 and a second transmitting/receiving apparatus 4 which are connected via a transmission path 3 for transmitting/receiving information in serial form. The transmission path 3 is formed of a first lane 31, a second lane 32, and a third lane 33.

Configuration of First Transmitting/Receiving Apparatus

The first transmitting/receiving apparatus 2 includes an input/output controller 21, a transmission packet generator 22, 8B10B converters (8B10Bs) 24A and 24B and parallel/serial converters (P/Ss) 26A and 26B which are provided for the first lane 31 and the second lane 32, and a retransmission controller 23, a 10B8B converter (10B8B) 25, and a serial/parallel converter (S/P) 27 which are provided for the third lane 33. The transmission packet generator 22 exemplifies a first generator. The 8B10B converters 24A and 24B and the parallel/serial converters 26A and 26B exemplify a first transmitting unit. The 10B8B converter 25 and the serial/parallel converter 27 exemplify a first receiving unit.

Configuration of Second Transmitting/Receiving Apparatus

The second transmitting/receiving apparatus 4 includes serial/parallel converters (S/Ps) 41A and 41B, 10B8B converters (10B8Bs) 43A and 43B, and a cyclic redundancy check (CRC) unit 45 which are provided for the first lane 31 and the second lane 32, a parallel/serial converter (P/S) 42, an 8B10B converter (8B10B) 44, and a response packet generator 46 which are provided for the third lane 33, and an input/output controller 47. The serial/parallel converters 41A and 41B and the 10B8B converters 43A and 43B exemplify a second receiving unit. The parallel/serial converter 42 and the 8B10B converter 44 exemplify a second transmitting unit. The CRC unit 45 exemplifies a detector. The response packet generator 46 exemplifies a second generator.

Transmission Path

The transmission path 3 is an electric cable for transporting electric signals. Alternatively, an optical cable for transporting optical signals may be used. When an optical cable is used, it is necessary to provide photoelectric converters on both of the transmission side and the reception side. Each of the lanes 31, 32, and 33 which form the transmission path 3 may include two lines which form a differential transmission line for transporting differential signals.

Configurations of Units of First and Second Transmitting/Receiving Apparatuses

The input/output controller 21 of the first transmitting/receiving apparatus 2 receives/transmits data from/to, for example, a reproducing apparatus. The input/output controller 47 of the second transmitting/receiving apparatus 4 receives/transmits data from/to, for example, a video display apparatus. The input/output controller 21 of the first transmitting/receiving apparatus 2 includes a transmission buffer (not illustrated) for storing transmitted data to be used for reproduction until a positive acknowledgement (ACK) is received.

The transmission packet generator 22 of the first transmitting/receiving apparatus 2 includes CRC generators 221A and 221B provided for the first lane 31 and the second lane 32, and packetizes data, e.g., image information, to be transferred (transmission data) so as to generate a transmission packet. The transmission packet will be described in detail below.

The retransmission controller 23 of the first transmitting/receiving apparatus 2 includes an error detector 231 and an error correction unit 232, and extracts data from the packet transmitted from the second transmitting/receiving apparatus 4 to the first transmitting/receiving apparatus 2. When a negative acknowledgement (NAK) is transmitted from the second transmitting/receiving apparatus 4, the retransmission controller 23 instructs the input/output controller 21 to retransmit the data.

The 8B10B converters 24A and 24B of the first transmitting/receiving apparatus 2 and the 8B10B converter 44 of the second transmitting/receiving apparatus 4 perform an 8B10B conversion which is a conversion of the number of bits of 8-bit data so as to output data on a 10-bit basis. The 10B8B converter 25 of the first transmitting/receiving apparatus 2 and the 10B8B converters 43A and 43B of the second transmitting/receiving apparatus 4 perform an 8B10B inverse conversion (10B8B conversion) which is an inverse conversion of the number of bits of 10-bit data by using a conversion table so as to output data on an 8-bit basis. The 8B10B conversion is a conversion for adjusting the direct current (DC) balance so that transmission data includes 0s and 1s in an appropriate manner. In a technique known as 8B10B, a group of data on an 8-bit basis is converted into 10-bit data having a ratio of the number of 0s to that of 1s which is close to a predetermined ratio of 50%, thereby adjusting the DC balance.

The CRC unit 45 extracts pieces of data from packets transmitted from the first transmitting/receiving apparatus 2 to the second transmitting/receiving apparatus 4, and performs CRC calculation on them. When no CRC errors are present, the CRC unit 45 merges the pieces of data with each other, and outputs the merged data to the input/output controller 47. The CRC unit 45 notifies the response packet generator 46 of each of the CRC results.

The response packet generator 46 generates a response packet in accordance with the CRC result, and transmits it to the first transmitting/receiving apparatus 2. The response packet will be described in detail below.

The parallel/serial converters 26A and 26B of the first transmitting/receiving apparatus 2 and the parallel/serial converter 42 of the second transmitting/receiving apparatus 4 each convert parallel data into serial data, i.e., perform P/S conversion, so as to transmit the serial data, and include a register for settings of, for example, the de-emphasis for attenuating the direct-current component of a signal waveform, the pre-emphasis for emphasizing the high-frequency components of a signal waveform, and a differential voltage, as initial settings at the time of power-on.

The serial/parallel converter 27 of the first transmitting/receiving apparatus 2 and the serial/parallel converters 41A and 41B of the second transmitting/receiving apparatus 4 each convert serial data into parallel data, i.e., perform S/P conversion, and include a register for settings of, for example, an equalizer for correcting degradation in a signal waveform which is caused in the transmission path 3, as initial settings at the time of power-on.

A part or the entirety of each of the components of the first and second transmitting/receiving apparatuses 2 and 4, such as the input/output controller 21 and the serial/parallel converters 41A and 41B, may be formed of a hardware circuit, such as a field programmable gate array (FPGA) or an application specific integrated circuit (ASIC). Alternatively, the components of the first and second transmitting/receiving apparatuses 2 and 4, such as the input/output controller 21 and the serial/parallel converters 41A and 41B, may be implemented by CPUs operating in accordance with programs in the computers in the first and second transmitting/receiving apparatuses 2 and 4.

Error Patterns

The error patterns will be described.

When 8-bit data is transmitted, the 8-bit data is converted into 10-bit data through the 8B10B conversion. There are ten patterns of the possibility that a 1-bit error occurs in the 10-bit data. FIGS. 2A to 2H illustrate pieces of reception data which are subjected to the 8B10B inverse conversion and which correspond to the ten error patterns. In FIGS. 2A to 2H, "D00.0" to "D31.7" in the column on the left side represent transmission data before the 8B10B conversion, and "1 bit" to "10 bit" represent the position of the bit at which an error occurs and which indicates a position from the first bit. Here, the data is represented by Dxx.y, where "xx" corresponds to the lower-order five bits which represent 0 to 31, and "y" corresponds to the higher-order three bits which represent 0 to 7. For example, in FIG. 2A, in the case where the transmission data D00.0 is subjected to a conversion from 8-bit into 10-bit, when an error occurs in the first bit, the data D00.0 is converted into the reception data D00.2. In the case where the transmission data D00.0 is subjected to a conversion from 8-bit into 10-bit, when an error occurs in the third bit, a not-in-table (NIT) error occurs because the corresponding data is not present in the conversion table. FIGS. 2A to 2H illustrate that all pieces of data corresponding to the "6 bit" to the "10 bit", i.e., lower-order five bits, are not-in-table (NIT) errors in FIGS. 2A, 2D, 2E, and 2H.

Figure 2A:
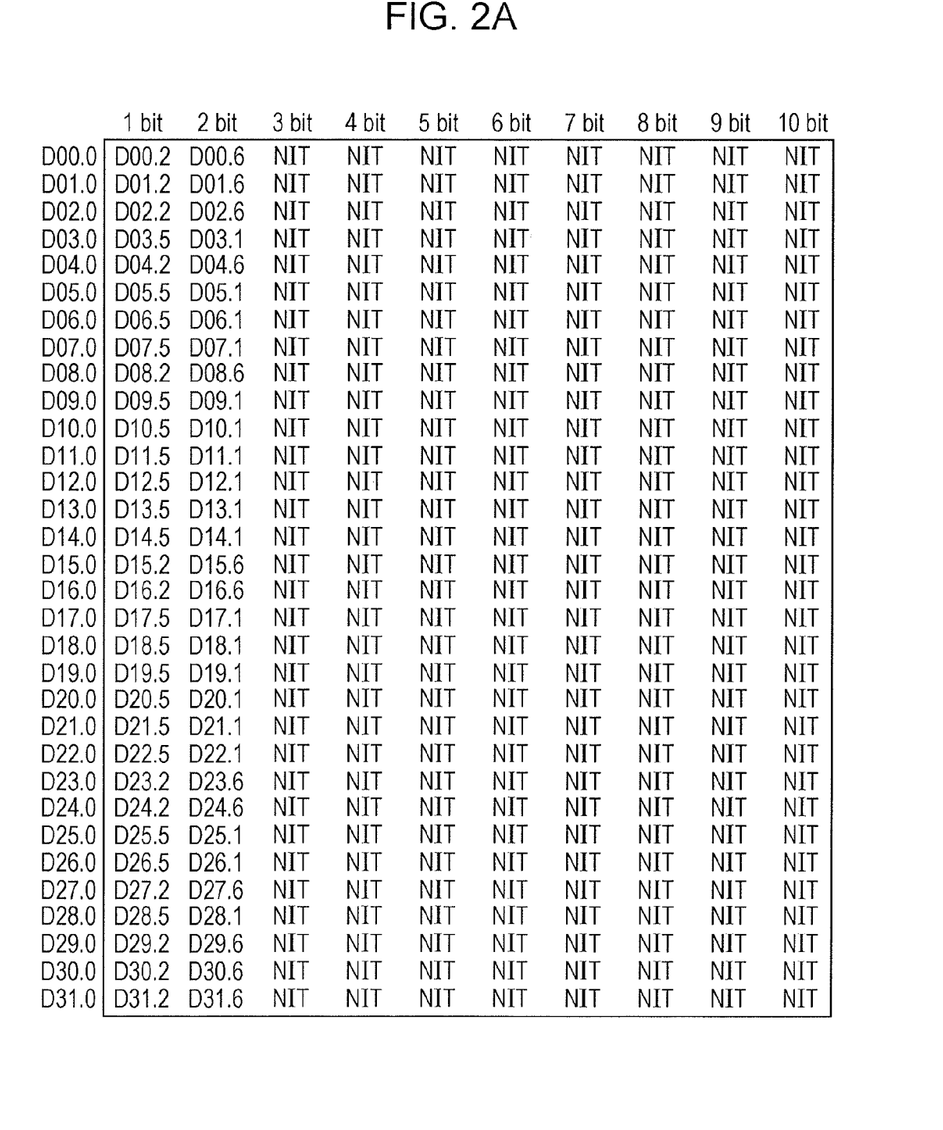
FIG. 2A is a diagram illustrating patterns of the 8B10B inverse conversion which correspond to ten error patterns.
Figure 2D:
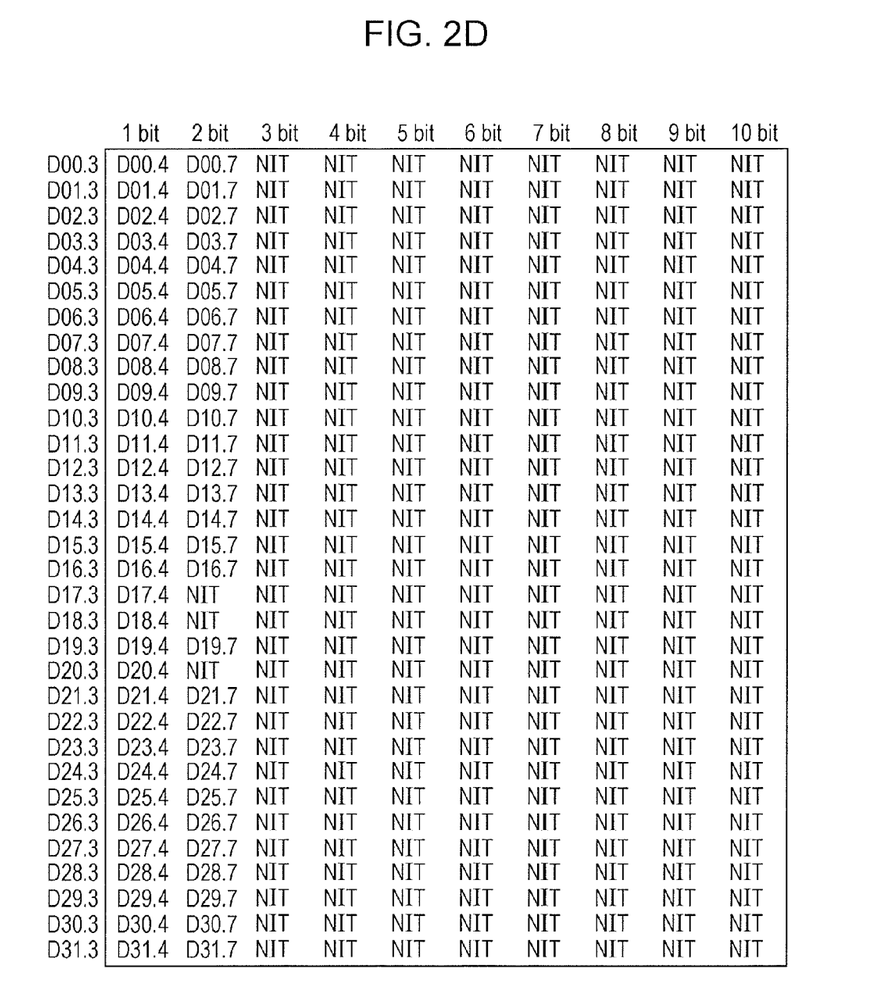
FIG. 2D is a diagram illustrating patterns of the 8B10B inverse conversion which correspond to ten error patterns.
Figure 3:
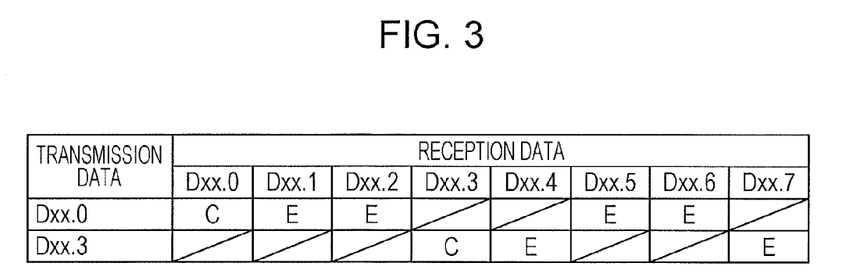
FIG. 3 is a table describing the error patterns in FIGS. 2A to 2H as the relationship between the transmission data and the reception data.

FIG. 3 is a table describing the error patterns in FIGS. 2A to 2H as the relationship between the transmission data and the reception data. In FIG. 3, 'C' represents correct reception data, and 'E' represents reception data in which a 1-bit error occurs. In the case where Dxx.0 is transmitted as transmission data, as seen in FIG. 2A, Dxx.0, Dxx.1, Dxx.2, Dxx.5, or Dxx.6 may be received as reception data. In the case where Dxx.3 is transmitted as transmission data, as seen in FIG. 2D, Dxx.3, Dxx.4, or Dxx.7 may be received as reception data.

Structure of Transmission Packet

Figure 4:
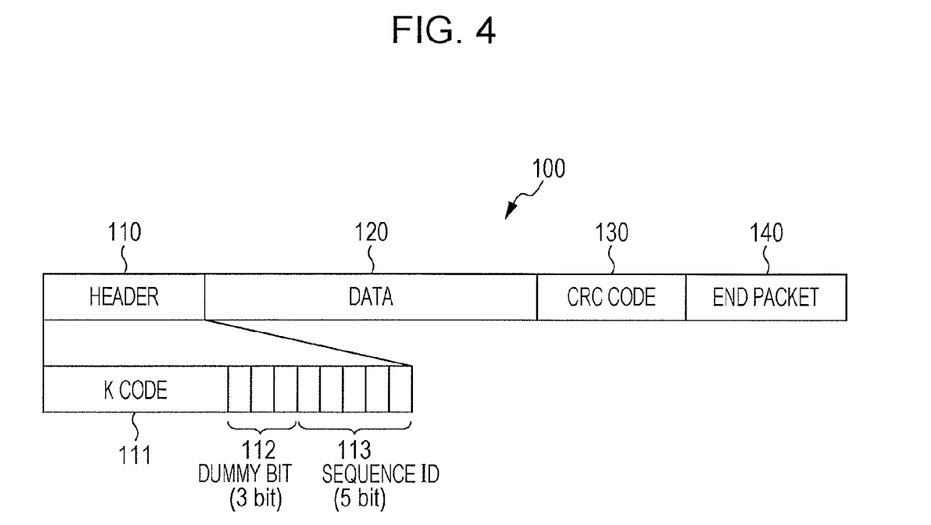
FIG. 4 is a diagram illustrating an exemplary configuration of a transmission packet.

FIG. 4 illustrates an exemplary configuration of a transmission packet generated by the transmission packet generator 22 of the first transmitting/receiving apparatus 2. A transmission packet 100 includes a header 110, data 120 to be transferred, a CRC code 130, and an end packet 140 indicating the end of the transmission packet 100. The header 110 includes a start packet 111 constituted by a code, such as a K code, indicating the start of the transmission packet 100, a dummy bit stream 112 of 3 bits, and a sequence ID 113 which identifies the first lane 31 or the second lane 32 and which serves as identification information of the transmission packet 100. For example, serial numbers are alternately attached as the sequence IDs to a transmission packet 100 to be transmitted via the first lane 31 and a transmission packet 100 to be transmitted via the second lane 32, whereby it is possible to identify the transmission packets 100 and to identify the first lane 31 or the second lane 32, depending on whether the least significant bit (LSB) of sequence ID 113 is '0' or '1'. The CRC code 130 exemplifies an error detecting code.

Each of the CRC generators 221A and 221B performs CRC calculation on data 120 to be transferred, so as to generate a CRC code 130. The transmission packet generator 22 adds a header 110, the CRC code 130 generated in the CRC generators 221A or 221B, and an end packet 140 to the data 120 to be transferred, so as to generate a transmission packet 100. The transmission packet generator 22 uses, as the dummy bit stream 112 and the sequence ID 113, a code, e.g., Dxx.y (xx: 0 to 31, y=0) illustrated in FIGS. 2A to 2H, with which it is possible to recognize the occurrence of a 1-bit error which is caused by the transportation when the transmission packet 100 is transmitted to the second transmitting/receiving apparatus 4. The characters "xx" represent the lower-order five bits corresponding to the sequence ID 113, and the character 'y' represents the higher-order three bits corresponding to the dummy bit stream 112. Thus, in the case where each of the 8B10B converters 24A and 24B converts the dummy bit stream 112 and the sequence ID 113 from 8-bit to 10-bit and transmits the resulting data, when an error occurs in any one bit among the ten bits, the sequence ID corresponding to the lower-order five bits results in a NIT error indicating that such data is not present in the conversion table, or is received without an error.

Configuration of Response Packet

Figure 5A:
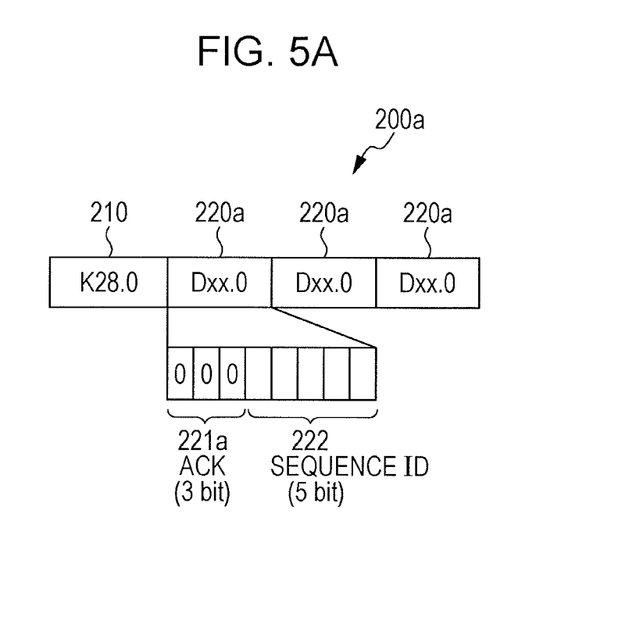
FIG. 5A is a diagram illustrating an exemplary configuration of a response packet for positive acknowledgement (ACK)
Figure 5B:
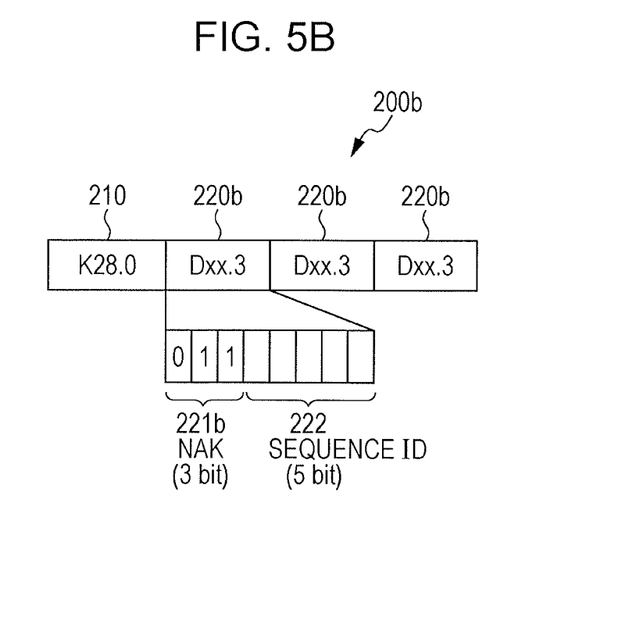
FIG. 5B is a diagram illustrating an exemplary configuration of a response packet for negative acknowledgement (NAK).

FIGS. 5A and 5B illustrate exemplary configurations of a response packet generated by the response packet generator 46 of the second transmitting/receiving apparatus 4. FIG. 5A illustrates a response packet for ACK and FIG. 5B illustrates a response packet for NAK.

As illustrated in FIG. 5A, an ACK response packet 200a includes a start packet 210 constituted by K28.0, and multiple, e.g., three, pieces of response information 220a. The response information 220a includes a positive acknowledgement (ACK) 221a in the higher-order three bits, and a sequence ID 222 in the lower-order five bits which is used to identify the lane 31 or 32 and transmission packet 100. As the response information 220a in the ACK response packet 200a, a code, e.g., Dxx.0, is used, with which it is possible to distinguish between the ACK and the NAK even when a 1-bit error occurs which is caused by the transportation when the response information 220a is transmitted to the first transmitting/receiving apparatus 2. The second transmitting/receiving apparatus 4 transmits the response information 220a three times. The number of pieces of response information 220a included in the ACK response packet 200a is not limited to three. In the start packet 210, other codes other than K28.0 may be used.

As illustrated in FIG. 5B, an NAK response packet 200b includes the start packet 210 constituted by K28.0, and three pieces of response information 220b. The response information 220b includes a negative acknowledgement (NAK) 221b in the higher-order three bits, and the sequence ID 222 in the lower-order five bits which is used to identify the lane 31 or 32 and the transmission packet 100. As the response information 220b of the NAK response packet 200b, a code, e.g., Dxx.3, is used, with which it is possible to distinguish between the ACK and the NAK even when a 1-bit error occurs which is caused by the transportation when the response information 220b is transmitted to the first transmitting/receiving apparatus 2. The second transmitting/receiving apparatus 4 transmits the response information 220b three times. It is possible to determine in which lane, i.e., the lane 31 or 32, an error occurs with respect to which transmission packet 100, from the NAK 221b and the sequence ID 222. Data Dxx.3 may be used in the response information 220a in the ACK response packet 200a, and data Dxx.0 may be used in the response information 220b of the NAK response packet 200b. The number of pieces of response information 220b included in the NAK response packet 200b is not limited to three.

The CRC unit 45 performs CRC calculation. The CRC unit 45 merges the pieces of data to output the merged data to the input/output controller 47 when no CRC errors are present, and notifies the response packet generator 46 of each set of the CRC result and the sequence ID.

Receiving the CRC result and the sequence ID from the CRC unit 45, the response packet generator 46 generates an ACK response packet 200a illustrated in FIG. 5A or an NAK response packet 200b illustrated in FIG. 5B in accordance with the CRC result.

When the response packet generator 46 transmits Dxx.0 as the response information 220a, as illustrated in FIG. 3, the first transmitting/receiving apparatus 2 may receive Dxx.0, Dxx.1, Dxx.2, Dxx.5, or Dxx.6 due to a 1-bit error. Accordingly, when the error detector 231 detects Dxx.1, Dxx.2, Dxx.5, or Dxx.6, the error correction unit 232 corrects the detected data Dxx.1, Dxx.2, Dxx.5, or Dxx.6 into Dxx.0. When the response packet generator 46 transmits Dxx.3 as the response information 220b, as illustrated in FIG. 3, the first transmitting/receiving apparatus 2 may receive Dxx.3, Dxx.4, or Dxx.7 due to a 1-bit error. Accordingly, when the error detector 231 detects Dxx.4 or Dxx.7 as the response information 220b, the error correction unit 232 corrects the detected data Dxx.4 or Dxx.7 into Dxx.3. When the error detector 231 detects a NIT error, the error correction unit 232 discards the response packet 200a or 200b. Accordingly, as long as all pieces of data received N times do not result in NIT errors, it is possible for the first transmitting/receiving apparatus 2 to receive an ACK/NAK correctly.

Receiving an NAK response packet 200b from the second transmitting/receiving apparatus 4, the retransmission controller 23 of the first transmitting/receiving apparatus 2 controls the input/output controller 21 to retransmit the data corresponding to the sequence ID 222. The input/output controller 21 outputs the data which corresponds to the sequence ID 222 and which is stored in the transmission buffer as retransmission data, to the transmission packet generator 22.

Operations of Exemplary Embodiment

An example of operations according to the exemplary embodiment will be described.

(1) Generation and Transmission of Transmission Packet

The CRC generators 221A and 221B of the first transmitting/receiving apparatus 2 perform CRC calculation on pieces of data 120 that are output from the input/output controller 21 and that are to be transferred, to generate CRC codes 130. The transmission packet generator 22 adds, to each piece of the data 120 to be transferred, a header 110, a corresponding one of the CRC codes 130, and an end packet 140 to generate a transmission packet 100.

The transmission packets 100 generated by the transmission packet generator 22 are subjected to the 8B10B conversion from 8-bit data to 10-bit data by the 8B10B converters 24A and 24B, are converted from parallel data to serial data by the parallel/serial converters 26A and 26B, and are transmitted in serial form from the first transmitting/receiving apparatus 2 via the first lane 31 and the second lane 32 in the transmission path 3 to the second transmitting/receiving apparatus 4.

(2) Generation and Transmission of Response Packet

When the second transmitting/receiving apparatus 4 receives the transmission packets 100, the transmission packets 100 are converted from serial data to parallel data by the serial/parallel converters 41A and 41B, are subjected to the 8B10B inverse conversion from 10-bit data into 8-bit data by the 10B8B converters 43A and 43B, and are input to the CRC unit 45.

The CRC unit 45 performs CRC calculation on the received pieces of data. When no CRC errors are present, the CRC unit 45 merges the pieces of data, and then outputs the merged data to the input/output controller 47 and notifies the response packet generator 46 of the CRC results and the sequence IDs.

Receiving the CRC results and the sequence IDs from the CRC unit 45, the response packet generator 46 generates an ACK response packet 200a or an NAK response packet 200b in accordance with each of the CRC results.

The ACK response packet 200a or the NAK response packet 200b generated by the response packet generator 46 is subjected to the 8B10B conversion from 8-bit data into 10-bit data by the 8B10B converter 44, and is then converted from parallel data to serial data by the parallel/serial converter 42. The resulting data is transmitted in serial form from the second transmitting/receiving apparatus 4 via the third lane 33 in the transmission path 3 to the first transmitting/receiving apparatus 2.

(3) Reception and Error Correction of Response Packet

When the first transmitting/receiving apparatus 2 receives an ACK response packet 200a or an NAK response packet 200b, the ACK response packet 200a or the NAK response packet 200b is converted from serial data into parallel data by the serial/parallel converter 27, is subjected to the 8B10B inverse conversion from 10-bit data into 8-bit data by the 10B8B converter 25, and is input into the retransmission controller 23.

The retransmission controller 23 extracts data from the response packet 200a or 200b transmitted from the second transmitting/receiving apparatus 4 to the first transmitting/receiving apparatus 2.

When the error detector 231 detects Dxx.4 or Dxx.7 other than Dxx.0 and Dxx.3 as the response information 220a, the error correction unit 232 corrects the detected data Dxx.4 or Dxx.7 to Dxx.3. When the error detector 231 detects an NIT error, the error correction unit 232 discards the response packet 200a or 200b.

(4) Retransmission Instruction

When the transmitting/receiving apparatus 4 transmits an NAK response packet 200b, the retransmission controller 23 instructs the input/output controller 21 to retransmit the data.

The input/output controller 21 transmits data which corresponds to the sequence ID 222 and which is stored in the transmission buffer as data for retransmission to the transmission packet generator 22, and the transmission packet generator 22 is instructed to retransmit it and generates a transmission packet 100. The transmission packet 100 which is again generated is subjected to the 8B10B conversion and the parallel/serial conversion as described above, and is then transmitted to the second transmitting/receiving apparatus 4.

Effect of Exemplary Embodiment

According to the exemplary embodiment, it is possible to transmit a response packet for a transmission packet without using complicated control. In addition, by transmitting response information sequentially multiple times, it is possible to transmit an ACK or an NAK correctly in comparison with a configuration in which response information is transmitted once.

As described above, the exemplary embodiment of the present invention is described. The present invention is not limited to the above-described exemplary embodiment, and various modifications may be made and embodied as long as the gist of the present invention is not modified. For example, the present invention may be used in the case where information about "Memory-Full" or "Memory-Empty" which indicates the buffer memory state on the reception side is transmitted.

In addition, for example, as long as the gist of the present invention is not modified, some of the components according to the exemplary embodiment may be removed, and steps may be, for example, added, removed, modified, or switched in the flowchart according to the exemplary embodiment. Further, programs used in the above-described exemplary embodiment may be stored in a recording medium such as a compact disc-read-only memory (CD-ROM) so as to be provided.

What is claimed is:

1. A transmitting/receiving system comprising:
   a first transmitting/receiving apparatus including:
      a first transmitting unit that subjects transmission data to which an error detecting code is attached, to a conversion of the number of bits and that transmits the converted transmission data;
      a first receiving unit that subjects a response to the transmission of the transmission data to which the error detecting code is attached, to an inverse conversion of the number of bits and that receives the converted response;
      an error detector that detects a 1-bit error; and
      an error correction unit that corrects at least one of a positive acknowledgment and a negative acknowledgment; and
   a second transmitting/receiving apparatus including:
      a second receiving unit that subjects the transmission data which has been transmitted by the first transmitting unit of the first transmitting/receiving apparatus, to an inverse conversion of the number of bits;
      a detector that detects an error on the basis of the error detecting code attached to the transmission data that has been subjected to the inverse conversion of the number of bits by the second receiving unit;
      a second generator that generates the positive acknowledgement or the negative acknowledgement in accordance with the presence or absence of the error detection performed by the detector and that uses a code with which it is possible to distinguish between the positive acknowledgement and the negative acknowledgement even when the 1-bit error occurs, the 1-bit error being caused by transportation when the positive acknowledgement or the negative acknowledgement is transmitted to the first transmitting/receiving apparatus; and a second transmitting unit that subjects the positive acknowledgement or the negative acknowledgement generated by the second generator, to a conversion of the number of bits and that transmits the converted acknowledgement to the first transmitting/receiving apparatus.

2. The transmitting/receiving system according to claim 1, wherein the first transmitting/receiving apparatus further includes a first generator that generates a transmission packet obtained by attaching first packet identification information to the transmission data to which the error detecting code is attached, and that uses a code with which, when the 1-bit error occurs, the 1-bit error being caused by transportation when the first packet identification information of the transmission packet is transmitted to the second transmitting/receiving apparatus, it is possible to recognize that the 1-bit error has occurred, wherein the first transmitting unit transmits the transmission packet to the second transmitting/receiving apparatus, and wherein the second generator of the second transmitting/receiving apparatus generates a response packet by attaching at least one piece of second packet identification information to the positive acknowledgement or the negative acknowledgement, and the second transmitting unit transmits the response packet to the first transmitting/receiving apparatus, the at least one piece of second packet identification being the first packet identification.

3. The transmitting/receiving system according to claim 2, wherein the at least one piece of second packet identification information includes a plurality of pieces of second packet identification information, and the second generator of the second transmitting/receiving apparatus generates the response packet by continuously attaching the plurality of pieces of second packet identification information to the positive acknowledgement or the negative acknowledgement.

4. The transmitting/receiving system according to claim 1, wherein the error correction unit corrects the positive acknowledgment and the negative acknowledgment.

5. A non-transitory computer readable medium storing a program causing computers which are included in first and second transmitting/receiving apparatuses, to execute a process comprising:

in the first transmitting/receiving apparatus,
subjecting transmission data to which an error detecting code is attached, to a conversion of the number of bits and transmitting the converted transmission data,
subjecting a response to the transmission of the transmission data to which the error detecting code is attached, to a first inverse conversion of the number of bits and receiving the converted response;
detecting a 1-bit error, and
correcting at least one of a positive acknowledgment and a negative acknowledgment; and in the second transmitting/receiving apparatus,
subjecting the transmission data which has been transmitted by the first transmitting/receiving apparatus, to a second inverse conversion of the number of bits,
detecting an error on the basis of the error detecting code attached to the transmission data that has been subjected to the second inverse conversion,
generating the positive acknowledgement or the negative acknowledgement in accordance with the presence or absence of the error detection and using a code with which it is possible to distinguish between the positive acknowledgement and the negative acknowledgement even when the 1-bit error occurs, the 1-bit error being caused by transportation when the positive acknowledgement or the negative acknowledgement is transmitted to the first transmitting/receiving apparatus, and
subjecting the positive acknowledgement or the negative acknowledgement which has been generated, to a conversion of the number of bits and transmitting the converted acknowledgement to the first transmitting/receiving apparatus.

6. A method performed in first and second transmitting/receiving apparatuses, the method comprising:

in the first transmitting/receiving apparatus,
subjecting transmission data to which an error detecting code is attached, to a conversion of the number of bits and transmitting the converted transmission data,
subjecting a response to the transmission of the transmission data to which the error detecting code is attached, to a first inverse conversion of the number of bits and receiving the converted response,
detecting a 1-bit error, and
correcting at least one of a positive acknowledgment and a negative acknowledgment; and in the second transmitting/receiving apparatus,
subjecting the transmission data which has been transmitted by the first transmitting/receiving apparatus, to a second inverse conversion of the number of bits,
detecting an error on the basis of the error detecting code attached to the transmission data that has been subjected to the second inverse conversion,
generating the positive acknowledgement or the negative acknowledgement in accordance with the presence or absence of the error detection and using a code with which it is possible to distinguish between the positive acknowledgement and the negative acknowledgement even when the 1-bit error occurs, the 1-bit error being caused by transportation when the positive acknowledgement or the negative acknowledgement is transmitted to the first transmitting/receiving apparatus, and
subjecting the positive acknowledgement or the negative acknowledgement which has been generated, to a conversion of the number of bits and transmitting the converted acknowledgement to the first transmitting/receiving apparatus.

* * * * *